United States Patent
Barrows

(10) Patent No.: US 8,079,546 B2
(45) Date of Patent: Dec. 20, 2011

(54) SAMARA WING

(75) Inventor: Timothy M. Barrows, Newton, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 398 days.

(21) Appl. No.: 12/456,585

(22) Filed: Jun. 18, 2009

(65) Prior Publication Data
US 2010/0324754 A1 Dec. 23, 2010

(51) Int. Cl.
*B64C 9/00* (2006.01)
(52) U.S. Cl. ............... 244/90 R; 244/90 A; 102/388
(58) Field of Classification Search ........... 244/90 R, 244/90 A, 213–217, 39, 48, 87, 89; 102/388
See application file for complete search history.

(56) References Cited

U.S. PATENT DOCUMENTS

| | | | |
|---|---|---|---|
| 2,921,404 A * | 1/1960 | Lescher | 446/34 |
| 3,273,834 A | 9/1966 | Bower | |
| 3,831,887 A * | 8/1974 | Fosness | 244/207 |
| 4,583,703 A | 4/1986 | Kline | |
| 4,635,553 A | 1/1987 | Kane | |
| 4,756,253 A | 7/1988 | Herring et al. | |
| 5,067,410 A | 11/1991 | Murnane, III et al. | |
| 6,834,593 B2 | 12/2004 | Nardone et al. | |
| 6,984,109 B2 * | 1/2006 | Bagai | 416/1 |

OTHER PUBLICATIONS

Kellas, Andreas. *The Guided Samara: Design and Development of a Controllable Single-Bladed Autorotating Vehicle*, MIT Thesis, submitted Aug. 2007, published Sep. 2007.

* cited by examiner

*Primary Examiner* — Timothy D Collins
*Assistant Examiner* — Jamie S Stehle
(74) *Attorney, Agent, or Firm* — Iandiorio Teska & Coleman

(57) ABSTRACT

A samara wing including a main wing with a leading edge and a trailing edge. An aileron has a leading edge and a trailing edge and is pivotally attached proximate the trailing edge of the main wing and separated therefrom by a gap. The aileron is rotatable between the first position where the trailing edge of the aileron is facing forward in a plummet mode of operation and a second position where the trailing edge of the aileron is facing rearward typically for an autorotation mode of operation.

12 Claims, 7 Drawing Sheets

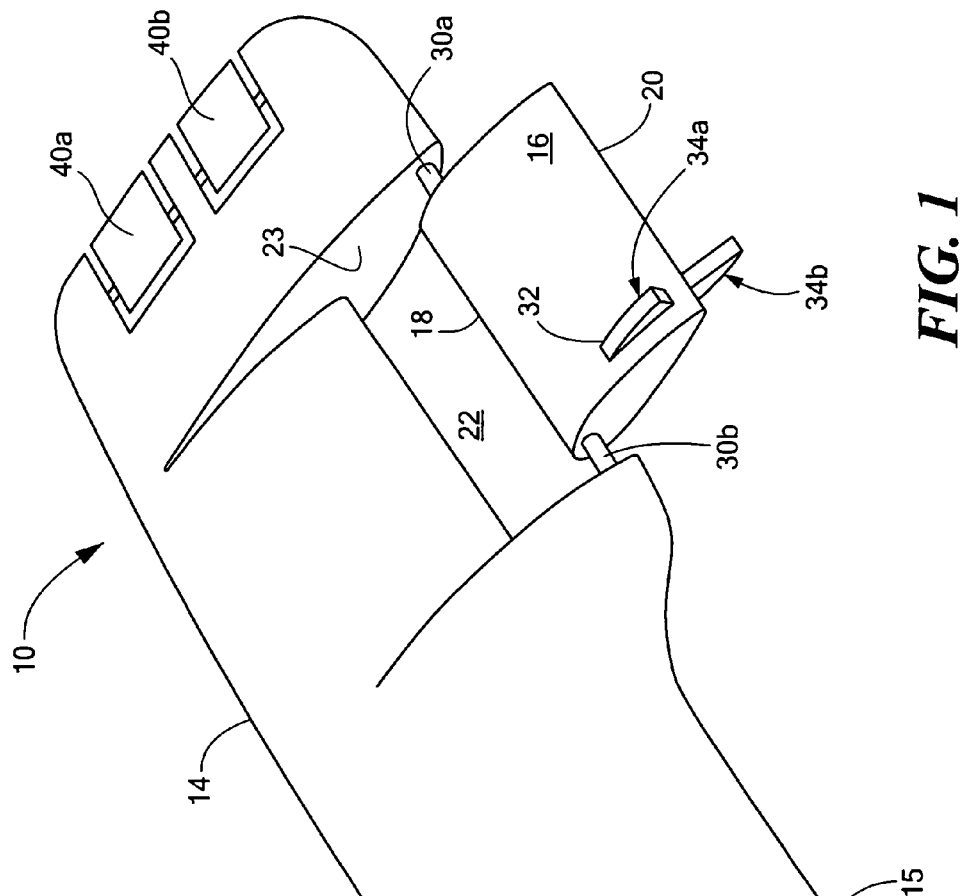
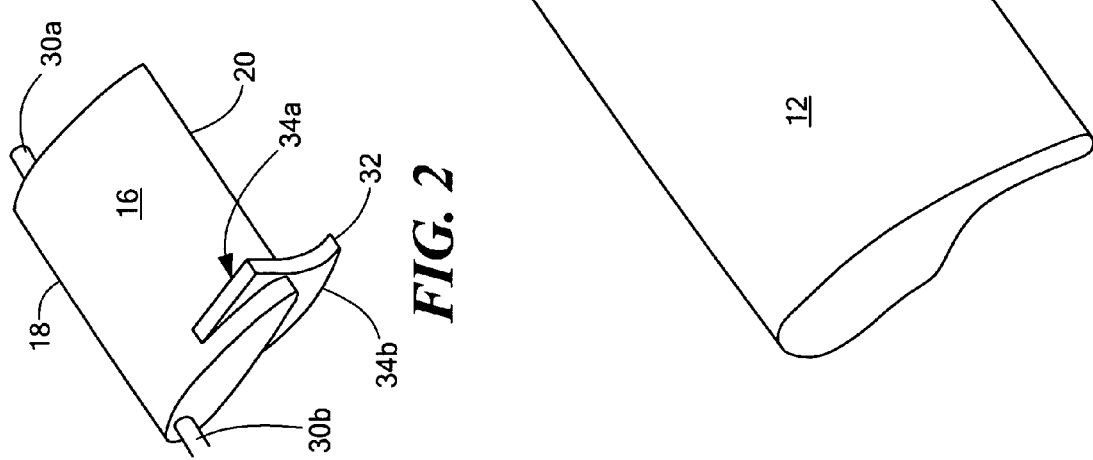

SAMARA WING

FIELD OF THE INVENTION

The subject invention relates to samara wings used in the air drop of payloads such as cargo, supplies, and sensors.

BACKGROUND OF THE INVENTION

Samara wings or blades for aircraft dispensed payloads such as cargo, supplies, munitions, and the like have previously been proposed. See U.S. Pat. Nos. 4,635,553; 4,583,703; 4,756,253; 5,067,410; 6,834,593; and 3,273,834 all incorporated herein by this reference. Once deployed, the wing spins (autorotates) much like a maple seed slowing the downward velocity of the payload attached to the wing. Steerable samara wings have also been proposed. See *The Guided Samara: Design and Development of a Controllable Single-Bladed Autorotating Vehicle*, Andreas Kellas, MIT Thesis, August 2007.

It is desirable in many air drop operations to have the payload quickly drop until at a lower elevation and a closer distance to the ground and only then slow the payload to a lower velocity for a softer landing. Also, winds aloft can adversely affect the accuracy of the desired drop point when the samara wing begins autorotating at high altitudes.

For most wing designs, the desire is to have a large amount of lift and a small amount of drag. The samara wing is no exception. The ratio of lift to drag is known as the wing efficiency. High efficiency is achieved by having some camber in the wing cross-section (the airfoil section.) Positive camber means the upper surface is more convex and the lower surface is either less convex, or flat, or even concave. This design creates a nose-down pitching moment.

It is difficult to design a single wing that has both pitch stability and pitch trim. The problem of designing a samara is very similar to the problem of designing a flying wing. The usual requirement for stability is to put the center of mass ahead of the aerodynamic center. This results in a nose-down moment. Something must be done to balance this moment. One solution is to use an airfoil section with upward curvature at the trailing edge, also known as a reflex trailing edge. Another solution that is used with flying wings is to have wing sweep and have the tips of the wings generate a down force. The term "wing sweep" means the left and right wings are swept relative to each other. Since a samara has only one wing, it is not clear what is meant by sweep.

A second problem could be called "control ambiguity." The conventional way to increase the lift on a wing is to have a flap at the trailing edge that deflects downward. However, the lift will only increase if the angle of attack of the main part (the unflapped part) of the wing remains fixed. Since the samara is a single wing with very little pitch stability, were a flap deflected downward, the angle of attack of the main wing would decrease. The net result is ambiguous—the lift will increase if the flap effect is larger, or it may decrease if the angle of attack effect predominates.

BRIEF SUMMARY OF THE INVENTION

It is therefore an object of this invention to provide a new samara wing for air drop operations.

It is a further object of this invention to provide such a samara wing which has two modes of operation: a plummet high-velocity mode during which the samara wing does not autorotate to quickly lose altitude and an autorotation slower velocity mode when the payload is closer to the ground for a soft landing of the payload.

It is a further object of this invention to provide such a samara wing which is steerable in both modes.

It is a further object of this invention to provide such a samara wing which is automatically actuatable.

It is a further object of this invention to provide such a samara wing which enables a more accurate drop point.

It is a further object of this invention to provide such a samara wing which is easy to deploy.

The subject invention results from the realization that a novel samara wing includes an aileron deployable between one configuration suitable for stowage and/or plummeting and a second configuration suitable for an autorotation mode of operation.

The subject invention, however, in other embodiments, need not achieve all these objectives and the claims hereof should not be limited to structures or methods capable of achieving these objectives.

The subject invention features a samara wing comprising a main wing with a leading edge and a trailing edge. An aileron has a leading edge and a trailing edge and the aileron is pivotally attached proximate the trailing edge of the main wing and separated therefrom by a gap. The aileron is rotatable between a first position where the trailing edge of the aileron is facing forward in a stowage configuration and/or plummet mode of operation and a second position where the trailing edge of the aileron is facing rearward.

In one example, the main wing includes a cutout proximate the distal end of the main wing and the aileron is rotatably disposed predominantly within the cutout in the stowage configuration and/or in the plummet mode of operation. Typically, the aileron further includes a drag fence for initiating autorotation of the main wing. The drag fence may include one or more surfaces extending outward from the aileron. One or more steering flaps may be pivotally mounted on a distal portion of the main wing.

The samara wing typically also includes an actuator for the aileron to rotate it between the first and second positions and a processor for controlling the actuator. An altimeter can be used to provide altitude data to the processor which is programmed to energize the actuator to rotate the aileron to the second position at a predetermined altitude. Also, the processor is programmed to energize the actuator to deflect the aileron in the autorotation mode of operation to steer the main wing.

One samara wing in accordance with the subject invention includes a main wing with a leading edge, a trailing edge, and a cutout proximate the distal end of the main wing. An aileron is rotatably predominantly disposed within the cutout in a plummet mode of operation and is actuatable to a second position where the aileron is not predominantly within the cutout in an autorotation mode of operation.

In one aspect of the subject invention, a samara wing includes a main wing with a leading edge and a trailing edge. An aileron is configured in a first mode to cause the main wing to plummet and in a second mode to increase the lift on the main wing as lift on the aileron decreases causing autorotation of the main wing. In one example, the aileron has a trailing edge facing forward in the first mode and facing rearward in the second mode.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 1 is a highly schematic three-dimensional top view showing an example of samara wing in accordance with the subject invention;

FIG. 2 is a highly schematic three-dimensional view showing the aileron portion of the samara wing of FIG. 1;

DETAILED DESCRIPTION OF THE INVENTION

Figure 3:
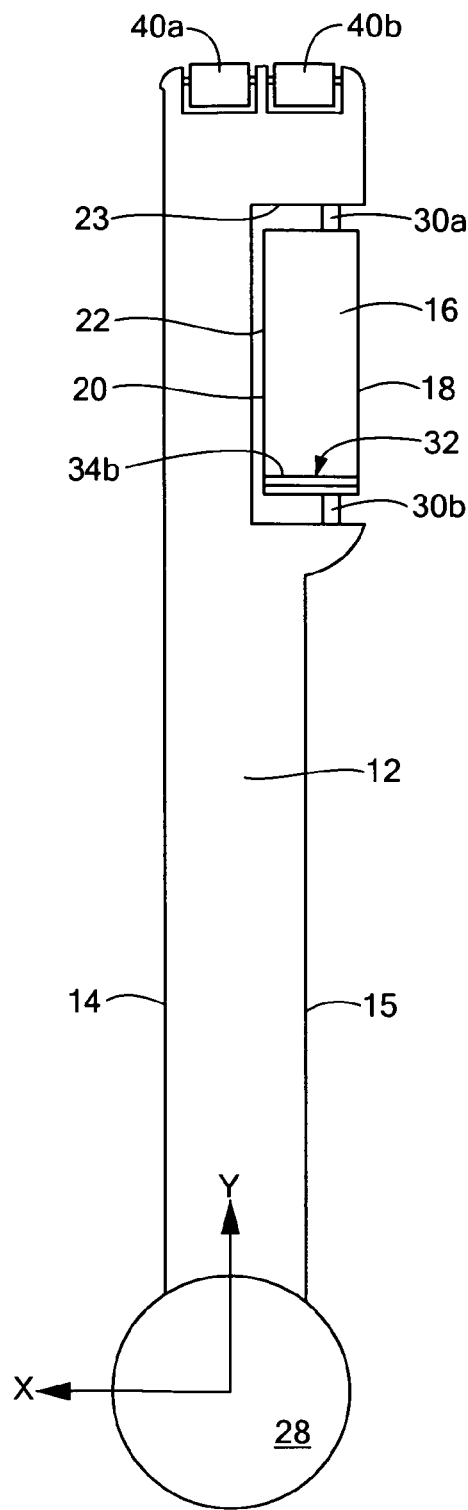
FIG. 3 is a schematic top-view of the samara wing shown in FIG. 1 in the high speed decent plummet configuration.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows samara wing 10 in accordance with one example of the subject invention. Main wing 12 includes leading edge 14 and trailing edge 15. Main wing 12 may be any desired airfoil shape known in the art. Main wing 12 may be composite in construction (e.g., a foam core covered with fibers in a resin matrix or any other known material). Samara wing 10 includes aileron 16 in accordance with the subject invention having a leading edge 18 and a trailing edge 20. Aileron 16 is pivotally attached to main wing 12 proximate trailing edge 15 of main wing 12 at a location along the wing which may vary according to the desired performance of the wing. Gap 22 between main wing 12 and aileron 16 allows aileron 16 to flip between the slow speed decent autorotation position shown in FIGS. 1 and 4 and a stowage or handling and/or high speed decent plummet configuration shown in FIG. 3. Gap 22, FIG. 1 also serves to trim and stabilize main wing 12.

Figure 4:
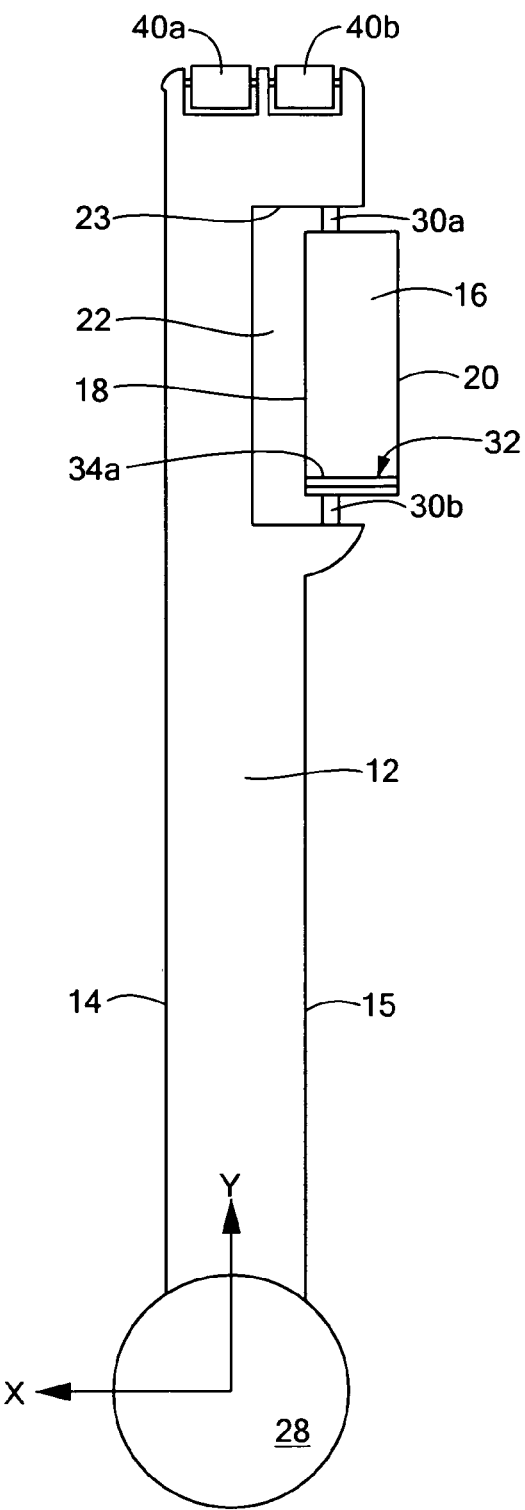
FIG. 4 is a schematic top-view of the samara wing shown in FIG. 1 in the lower velocity autorotation configuration.

When aileron 16 is in the position shown in FIG. 3 and trailing edge 20 of aileron 16 is facing forward, the wing does not autorotate and payload 28 plummets at a high velocity to the ground. Alternatively, the position of aileron 16 shown in FIG. 3 can be used for storing and handling the wing. When aileron 16 is flipped into the position shown in FIGS. 1 and 4 (e.g., rotated 150°-190°) and trailing edge 20 is facing rearward, main wing 12 autorotates slowing the velocity of payload 28. In this way, during an air drop, the payload quickly "clears the sky" and then at a lower altitude slows for its final decent to the ground for a soft landing. Also, during the plummet configuration, winds aloft do not have as much of an effect on the samara wing resulting in the ability to better predict the drop point.

In one embodiment, main wing 12, FIG. 1 includes a cutout 23 proximate the distal end of main wing 12 defining gap 22 and aileron 16 is pivotal via shafts 30a and 30b. In the storage or plummet mode of operation as shown in FIG. 3, aileron 16 is disposed within the cutout as shown. In one preferred embodiment, aileron 16 includes drag fence 32, FIGS. 1 and 2 for assisting in the initiation of autorotation of the main wing. One surface 34a extends outward from an edge of the top of aileron 16 and another surface 34b may extend outward from an edge of the bottom of aileron 16. The location and the design of the drag fence may vary. Optional steering flaps 40a and 40b, FIG. 1 pivotally mounted on the distal end of main wing 12 may be provided to control the direction of the main wing in the plummet mode of operation.

Figure 5:
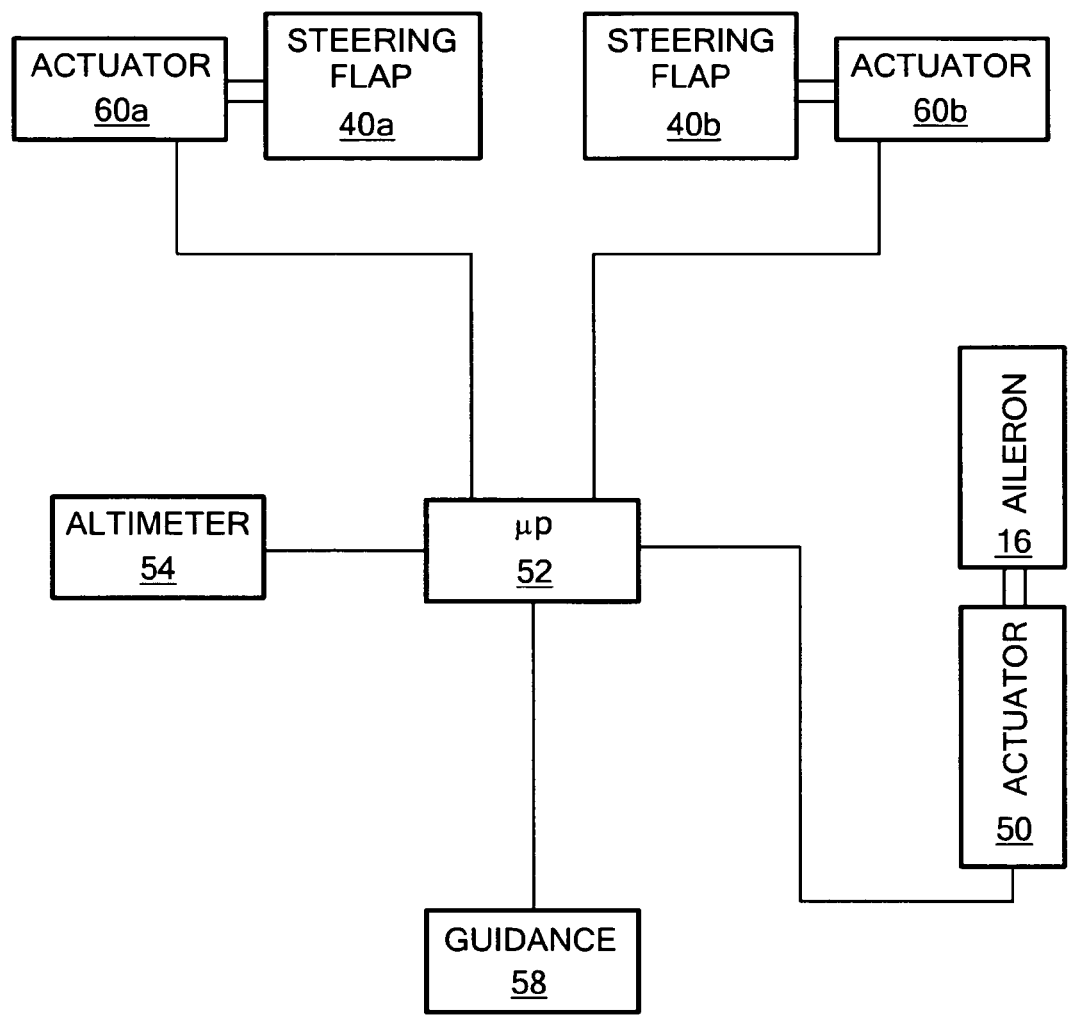
FIG. 5 is a schematic block diagram showing the primary components of the controlling electronics associated with a samara wing in accordance with an example of the subject invention.
Figure 6:
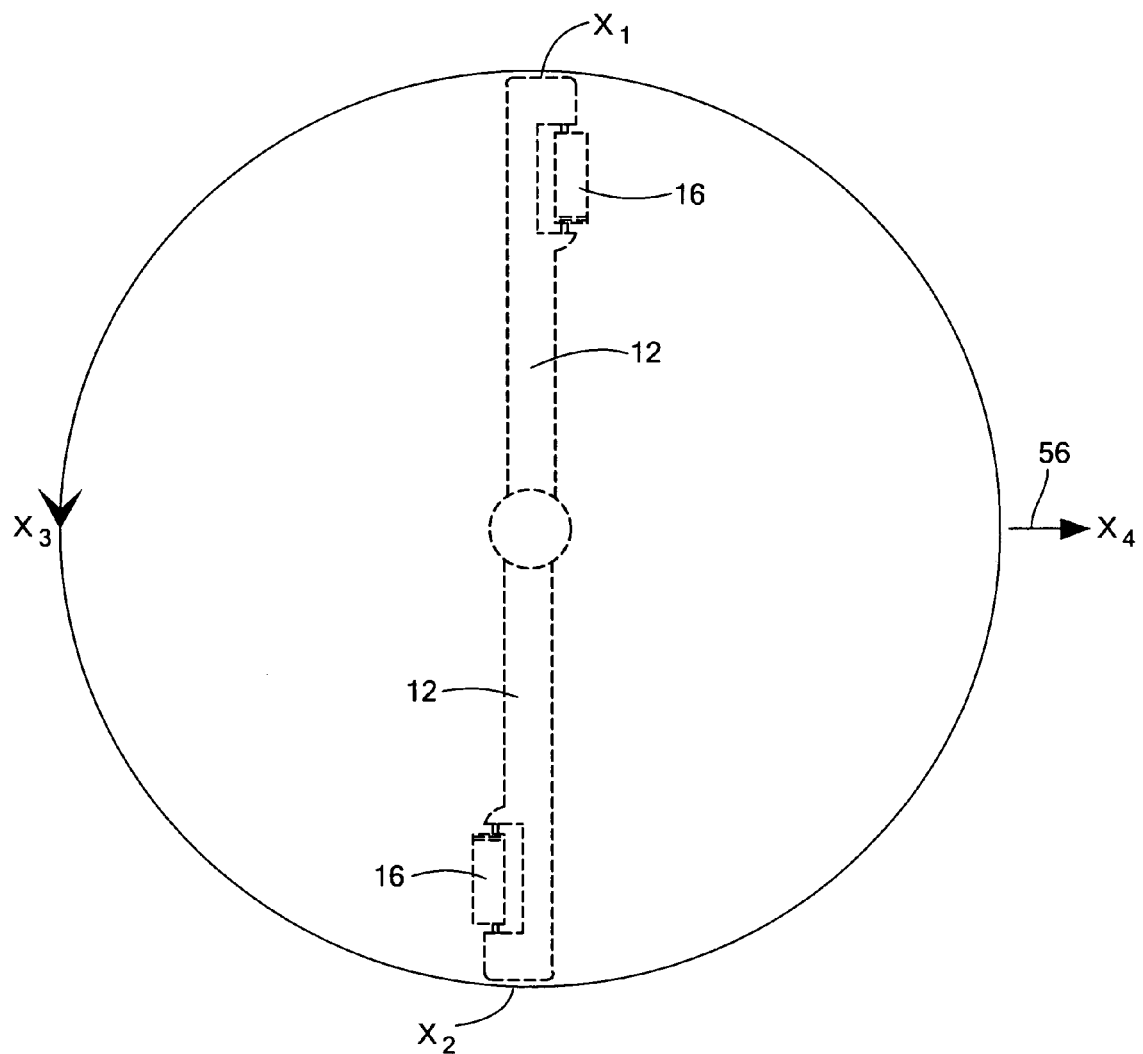
FIG. 6 is a schematic depiction showing two positions of an autorotating samara wing and how the aileron of the subject invention can be used to steer the samara wing in the autorotation mode.

FIG. 5 shows an example of a control subsystem including actuator 50 (e.g. a motor) for aileron 16 which flips the aileron between the plummet and autorotation positions and which also actuates aileron 16 up and down in the autorotation mode of operation for steering the samara wing. Processing electronics 52 controls actuator 50 and may be programmed to energize actuator 50 to flip aileron 16 to the autorotation position (see FIGS. 1 and 4) at a predetermined altitude (e.g., between 100 and 500 feet above ground level) based on input from altimeter 54. In another embodiment, a torsional spring is used to flip the aileron and the actuator is only used for fine control. Tilting aileron 16 as the main wing rotates can be used to control the lift on the main wing and thus steer the main wing. For example, at wing 12 position $X_1$ in FIG. 6, actuator 50, FIG. 4 may raise aileron 16 five degrees (from horizontal) and at wing position $X_2$ motor 50 may be energized to lower the aileron 16 five degrees. This will cause the plane of rotation to tilt such that point $X_3$ becomes higher than point $X_4$. This in turn will tilt the lift vector such that the samara moves in the direction shown by vector 56. This in turn will steer the main wing in the direction shown by vector 56. Guidance package 58 (including, for example, a gyro compass and the like) can be used to determine the position of the main wing and provide signals to processor 52 accordingly. Actuators 60a and 60b (e.g., motors) energized by processor 52 control the position of steering flaps 40a and 40b, respectively, in the plummet mode of operation. All of these subsystems may be located within the main wing, within the cargo carried by the main wing, or may be distributed between the main wing and the cargo. The control surfaces can be moved by conventional servo motors, or by more advanced concepts such as electro-active materials.

Figure 10:
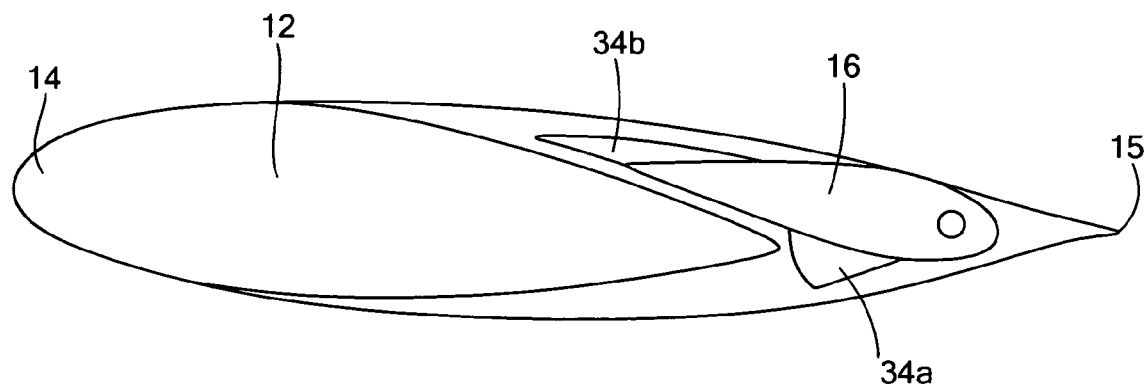
FIG. 10 is a schematic cross-sectional side-view showing the aileron in the stowed position.

FIG. 3 shows the samara wing in the configuration used for stowage and for deployment from the carrier aircraft. This may also be the high-speed descent, or plummet configuration. In this configuration, the samara descends with the payload end first, and the wing does not rotate. Aileron 16 is oriented such that its trailing edge 20 faces in the positive X direction. During this phase, aileron 16 is not active in controlling the flight path. Drag fence 32 is also shielded from the airstream as shown in FIG. 10. In this embodiment, the cutout can be made smaller by having the aileron overlay a portion of the main wing. The high speed steering flaps 40a and 40b, FIG. 3 at the uppermost wing edge guide the samara during this phase of flight. By operating these flaps differentially, a roll torque can be produced. This allows a "bank to steer" type of control. The combination of differential control for roll (rotation about the y axis) and collective control for pitch (rotation about the x axis) creates the ability to aim in any desired direction, and to control the glideslope, within limits.

Before landing, the samara typically transitions to the autorotation mode. This is done by rotating aileron 16 one-hundred-eighty degrees, more or less, about its control axis to the position shown in FIG. 4. The preferred aileron has drag fence 32 on the inboard side. This drag fence is small enough that it is essentially shielded from the flow in the configuration of FIG. 10. The transition to the configuration in FIG. 4 exposes the drag fence to the airstream.

Figure 7:
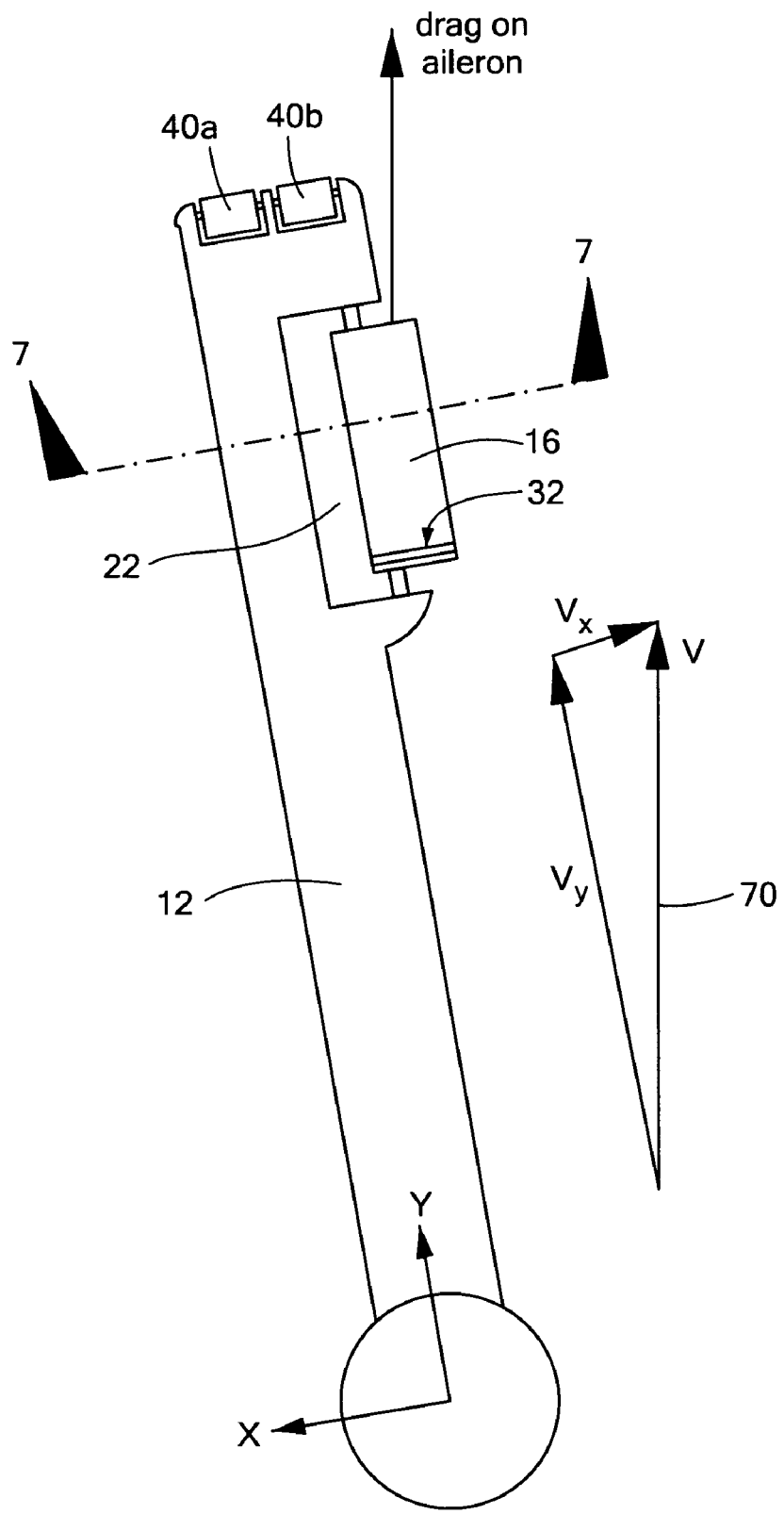
FIG. 7 is another schematic top-view of a samara wing in accordance with the subject invention.
Figure 8:
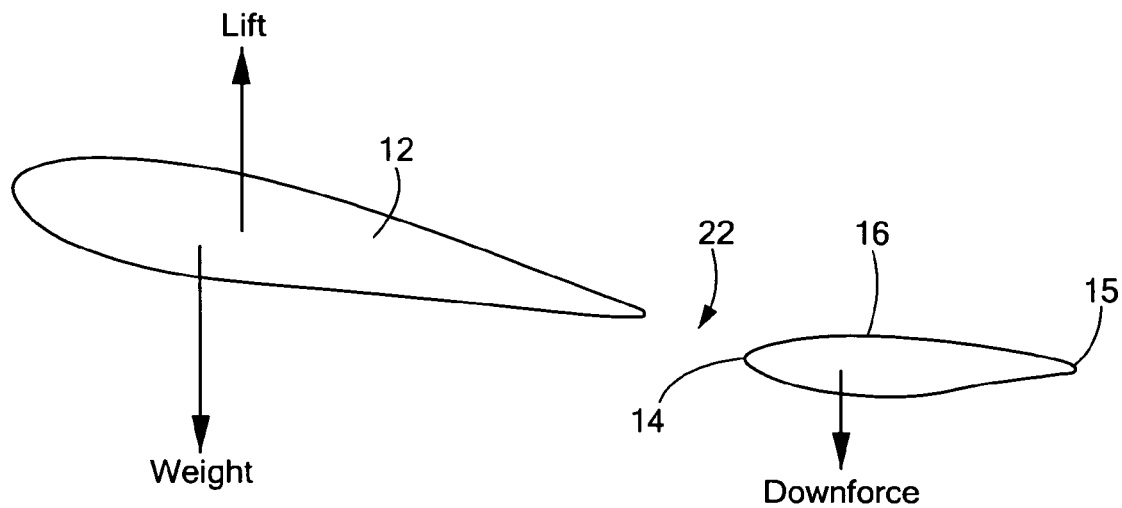
FIG. 8 is a highly schematic cross-sectional view taken along line 7-7 of FIG. 6.

The beginning of the transition may be understood with the aid of FIGS. 7 and 8. The center of gravity of the samara is located well forward (in the X direction) of the geometric center. The combined effect of this forward center of gravity and the drag of the drag fence results in the wing assuming an angle relative to the vertical. In a coordinate frame fixed to the samara wing, the relative wind is the reverse of the descent speed, vertically upward as shown by the vector 70. This wind may be decomposed into a component $V_y$ parallel to the long axis of the wing and a cross-wise component $V_x$. This cross-wise component creates lift on both main wing 12 and the aileron 16 as shown in FIG. 8.

One feature of the present invention is that there is a substantial gap between the main wing and the aileron. For conventional aircraft, the objective is to have very little gap so that the circulation on the main wing is controlled by the deflection of the aileron. In conventional operation, the trailing edge of an aileron is deflected downward to simultaneously increase the lift on the aileron and the wing, and deflected upward to decrease the lift on both items.

In the present invention, the opposite is desired. That is, deflecting the trailing edge 20 of aileron 16 upward (e.g., +5° from horizontal) causes the lift on the aileron to decrease, but causes the lift on main wing 12 to increase due to an increase in the pitch angle of the samara. In the autorotation mode, "pitch" is rotation about the Y axis shown in FIG. 7. The increased pitch angle means the angle of attack of both surfaces increases. Gap 22 allows this independent action to occur since aileron 16 does not control the circulation of the main wing. The lift on the wing can increase while that on the aileron decreases.

Figure 9:
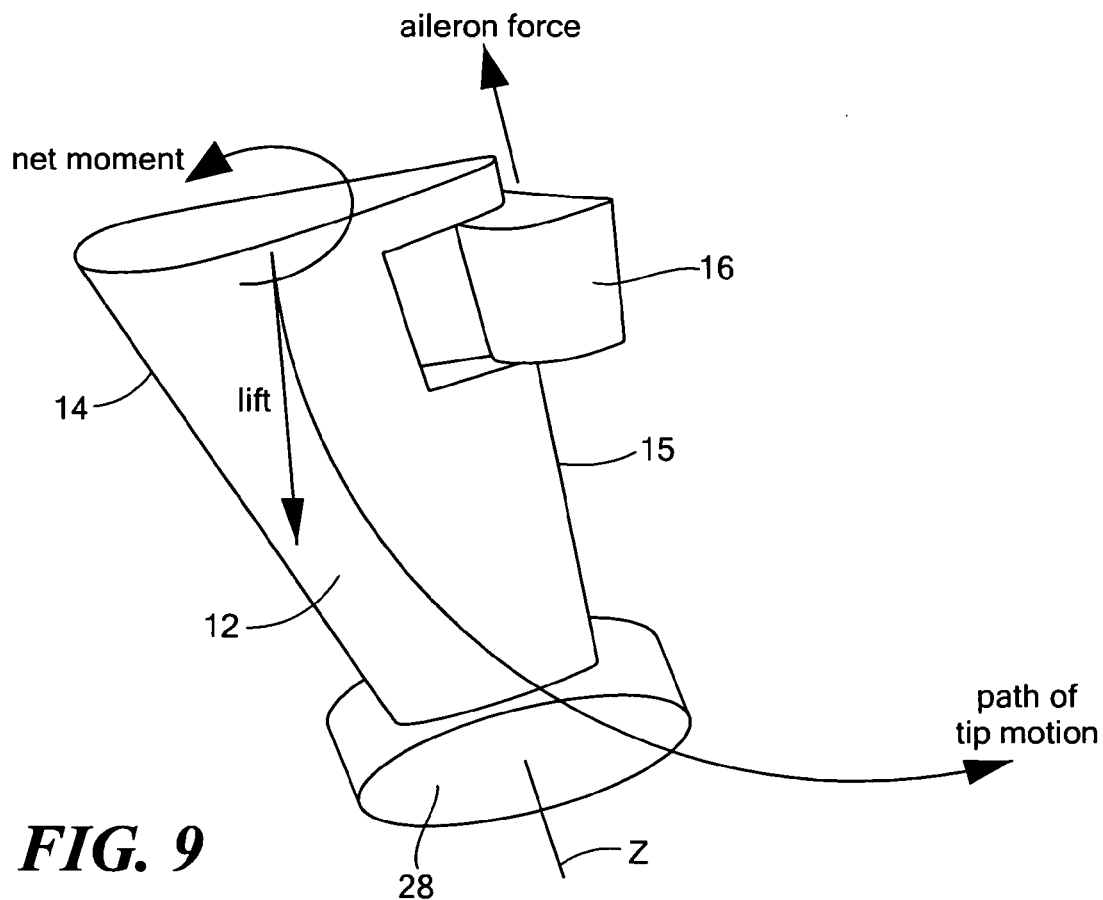
FIG. 9 is a schematic three-dimensional of an autorotating samara wing in accordance with the subject invention.

The next stage of transition is shown in FIG. 9. This figure is an attempt to show a similar view as FIG. 8 but looking downward. The airfoil section ends up being upside down from that shown in FIG. 7. For simplicity, the high-speed steering flaps are not shown. With aileron 16 deflected as shown, its lift force causes wing 12 to rotate counterclockwise about the vertical axis. As the rotation speed increases, centrifugal force forces the tip of the wing to spiral outward. Eventually, the wing ends up rotating like a maple seed.

The transition results in the samara entering the autorotation mode. In this mode, the trajectory of the samara is controlled by cyclically varying the angle of aileron 16 at a frequency that synchronizes with the rotation of the wing. This cyclic variation causes the rotation axis to tilt relative to the vertical direction. Since the average lift vector coincides with the axis of rotation, the descent path of the samara can be controlled in any direction as discussed above with respect to FIG. 6.

FIG. 8 also shows how the flap can be used to trim the wing. The center of mass is forward of the lift vector of the main wing creating a nose-down pitching moment. The aileron is deflected upward creating a downforce resulting in a net balance about the center of mass.

In the subject invention both trim and stability can be achieved even with positive camber on the main wing. The aileron has some leverage over the pitch of the main wing unlike concepts in which the control surface is embedded in the main wing. The amount of power required to vary the lift by operating the control surfaces is reduced in direct proportion to the amount of leverage.

The Army has a need for high accuracy airdrop of supplies. The current accuracy "goal" for guided parafoils is 100 meters. This may be adequate for cargo under benign conditions but there is a need for greater accuracy in more challenging environments such as mountainous terrain. The samara wing of the subject invention provides the required improvement in accuracy. Commercial applications would include such things as using air drops to deliver supplies and packages to offshore oil rigs, or to deliver humanitarian relief supplies.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A samara wing comprising:
   a main wing with a leading edge and a trailing edge; and
   an aileron having an airfoil-shaped cross section with a rounded leading edge and a tapered trailing edge, the aileron pivotally attached proximate the trailing edge of the main wing and separated therefrom by a gap, the aileron rotatable between a first position where the trailing edge of the aileron is facing forward for either a stowage configuration or a plummet mode of operation and a second position where the trailing edge of the aileron is facing rearward.

2. The samara wing of claim 1 in which the main wing includes a cutout proximate the distal end of the main wing and the aileron is rotatably disposed predominantly within the cutout in the stowage configuration or in the plummet mode of operation.

3. The samara wing of claim 1 in which the aileron further includes a drag fence for initiating autorotation of the main wing.

4. The samara wing of claim 3 in which the drag fence includes at least one surface extending outward from the aileron.

5. The samara wing of claim 1 further including at least one steering flap pivotally mounted on a distal portion of the main wing.

6. The samara wing of claim 1 further including an actuator to rotate the aileron between the first and second positions and a processor for controlling the actuator.

7. The aileron of claim 6 further including an altimeter providing altitude data to the processor which is programmed to energize the actuator to rotate the aileron to the second position at a predetermined altitude.

8. The aileron of claim 6 in which the processor is programmed to energize the actuator to cyclically deflect the aileron in an autorotation mode of operation to control the tilt of the plane of rotation and thereby steer the main wing.

9. A samara wing comprising:
a main wing with a leading edge, a trailing edge, and a cutout proximate the distal end of the main wing;
an aileron having an airfoil-shaped cross section with a rounded leading edge and a tapered trailing edge, the aileron pivotally attached proximate the trailing edge of the main wing and rotatably disposed to be predominantly within the cutout during either storage or in a plummet mode of operation and actuatable to a second position where the aileron is predominantly outside the cutout in an autorotation mode of operation.

10. A samara wing comprising:
a main wing with a leading edge and a trailing edge;
an aileron including:
a rounded leading edge,
a tapered trailing edge,
a drag fence including at least one surface extending outward from the aileron,
the aileron rotatable between a first position where the trailing edge of the aileron is facing forward during either stowage or a plummet mode of operation and a second position where the trailing edge of the aileron is facing rearward in an autorotation mode of operation.

11. A samara wing comprising:
a main wing with a leading edge and a trailing edge;
an aileron having an airfoil-shaped cross-section with a rounded leading edge and a tapered trailing edge, the aileron pivotally attached proximate the trailing edge of the main wing and separated therefrom by a gap, the aileron rotatable between a first position where the trailing edge of the aileron is facing forward and a second position where the trailing edge of the aileron is facing rearward;
an actuator to rotate the aileron between the first and second positions;
an altimeter providing altitude data; and
a processor responsive to the altimeter and programmed to energize the actuator to rotate the aileron to the second position at a predetermined altitude.

12. A samara wing comprising:
a main wing with a leading edge and a trailing edge; and
an aileron having an airfoil-shaped cross section with a rounded leading edge and a tapered trailing edge facing forward in a first mode and facing rearward in a second mode, a bulk of the cross-sectional area of the aileron displaced further aft relative to the main wing, the aileron configured in the first mode to cause the main wing to plummet and in the second mode to cause the main wing to briefly plummet with an orientation that is angled relative to the vertical direction of fall, creating a lift force perpendicular to the direction of fall that leads the main wing to begin autorotation.

* * * * *